US012445629B2

(12) United States Patent
Giladi

(10) Patent No.: US 12,445,629 B2
(45) Date of Patent: Oct. 14, 2025

(54) METHOD AND APPARATUS FOR CONTENT-ADAPTIVE FRAME DURATION EXTENSION

(71) Applicant: Comcast Cable Communications, LLC, Philadelphia, PA (US)

(72) Inventor: Alexander Giladi, Princeton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 118 days.

(21) Appl. No.: 16/817,228

(22) Filed: Mar. 12, 2020

(65) Prior Publication Data

US 2020/0296386 A1    Sep. 17, 2020

Related U.S. Application Data

(60) Provisional application No. 62/817,939, filed on Mar. 13, 2019.

(51) Int. Cl.
*H04N 19/154* (2014.01)
*H04N 19/172* (2014.01)
*H04N 19/36* (2014.01)
*H04N 19/46* (2014.01)

(52) U.S. Cl.
CPC ......... *H04N 19/154* (2014.11); *H04N 19/172* (2014.11); *H04N 19/36* (2014.11); *H04N 19/46* (2014.11)

(58) Field of Classification Search
CPC .. H04N 19/132; H04N 19/137; H04N 19/154; H04N 19/172; H04N 19/36; H04N 19/507; H04N 21/234381; H04N 21/236; H04N 21/434
See application file for complete search history.

(56) References Cited

U.S. PATENT DOCUMENTS

| 9,818,451 | B1* | 11/2017 | Tyagi | G11B 27/3081 |
| 2007/0074251 | A1 | 3/2007 | Oguz et al. | |
| 2007/0274385 | A1* | 11/2007 | He | H04N 19/51 |
| | | | | 375/E7.149 |
| 2009/0268097 | A1* | 10/2009 | Lin | H04N 19/87 |
| | | | | 348/700 |
| 2010/0027663 | A1* | 2/2010 | Dai | H04N 19/48 |
| | | | | 375/E7.123 |

(Continued)

FOREIGN PATENT DOCUMENTS

WO        2017/160606 A1      9/2017

*Primary Examiner* — Francis Geroleo
(74) *Attorney, Agent, or Firm* — BakerHostetler

(57) ABSTRACT

Systems and methods are described herein for processing video data. An encoder may transmit information indicating a duration that a particular frame should be displayed. The information may comprise an indication of whether the particular frame should be displayed for an increased duration. The encoder may decide during encoding, a whether the particular frame should be displayed for an increased duration (e.g., doubled, tripled, or more). The decision may be based on a similarity analysis performed by the encoder on two or more frames. Information indicating the decision may be inserted into a message, which may then be transmitted in a transport stream comprising encoded video data to a decoder. The decoder may decode the information and cause a display device to display the particular frame for the increased duration.

20 Claims, 4 Drawing Sheets

(56) References Cited

U.S. PATENT DOCUMENTS

| | | | |
|---|---|---|---|
| 2010/0111180 A1* | 5/2010 | Gao | H04N 19/115 |
| | | | 375/E7.243 |
| 2011/0051010 A1* | 3/2011 | Jiossy | H04N 19/142 |
| | | | 348/700 |
| 2012/0287987 A1 | 11/2012 | Budagavi et al. | |
| 2013/0010859 A1* | 1/2013 | Schwaab | H04N 19/172 |
| | | | 375/240.03 |
| 2016/0065792 A1* | 3/2016 | Golestaneh | H04N 19/87 |
| | | | 348/700 |
| 2017/0272755 A1* | 9/2017 | Holcomb | H04N 19/58 |
| 2019/0230358 A1* | 7/2019 | Lu | H04N 19/136 |
| 2020/0177927 A1* | 6/2020 | Yang | H04N 21/23439 |

\* cited by examiner

METHOD AND APPARATUS FOR CONTENT-ADAPTIVE FRAME DURATION EXTENSION

CROSS REFERENCE TO RELATED APPLICATIONS

This application claims the benefit of U.S. Provisional Patent Application No. 62/817,939, filed Mar. 13, 2019, the contents of which are incorporated by reference in their entirety as if fully set forth herein.

BACKGROUND

When processing and encoding video content, in many cases adjacent frames of video content are very similar to each other even without any motion compensation. Frames may be very similar because of a lack of change (e.g., in a still or nearly still scene), black frames, or the use of strong quantization making changes barely visible. Moreover, in some cases, such as shortly after or just before a scene change, small differences between frames may be imperceptible. However, typically all of these frames are still coded during video encoding.

Accordingly, there is a need for improved methods and apparatuses for encoding similar frames in video content. These and other shortcomings are addressed in the present disclosure.

SUMMARY

Systems and methods are described herein for processing video data. An encoder may transmit information indicating a duration that a particular frame should be displayed. The information may comprise an indication of whether the particular frame should be displayed for an increased duration. The encoder may decide during encoding, a whether the particular frame should be displayed for an increased duration (e.g., doubled, tripled, or more). The decision may be based on a similarity analysis performed by the encoder on two or more frames. By displaying a particular frame for an increased duration based on a similarity analysis, the encoder does not need to encode the frames determined to be similar to the particular frame being displayed for the increased duration. As a result, compression efficiency may be improved because the encoder may encode fewer total frames when sending a stream of video content to a decoder. Information indicating the decision may be inserted into a message.

The message may comprise a supplemental enhancement information (SEI) message, which may then be transmitted in a transport stream comprising encoded video data to a decoder. The decoder may decode the information and cause a display device to display the particular frame for the increased duration.

BRIEF DESCRIPTION OF THE DRAWINGS

The following drawings show generally, by way of example, but not by way of limitation, various examples discussed in the present disclosure. In the drawings.

DETAILED DESCRIPTION OF ILLUSTRATIVE EMBODIMENTS

Figure 1:
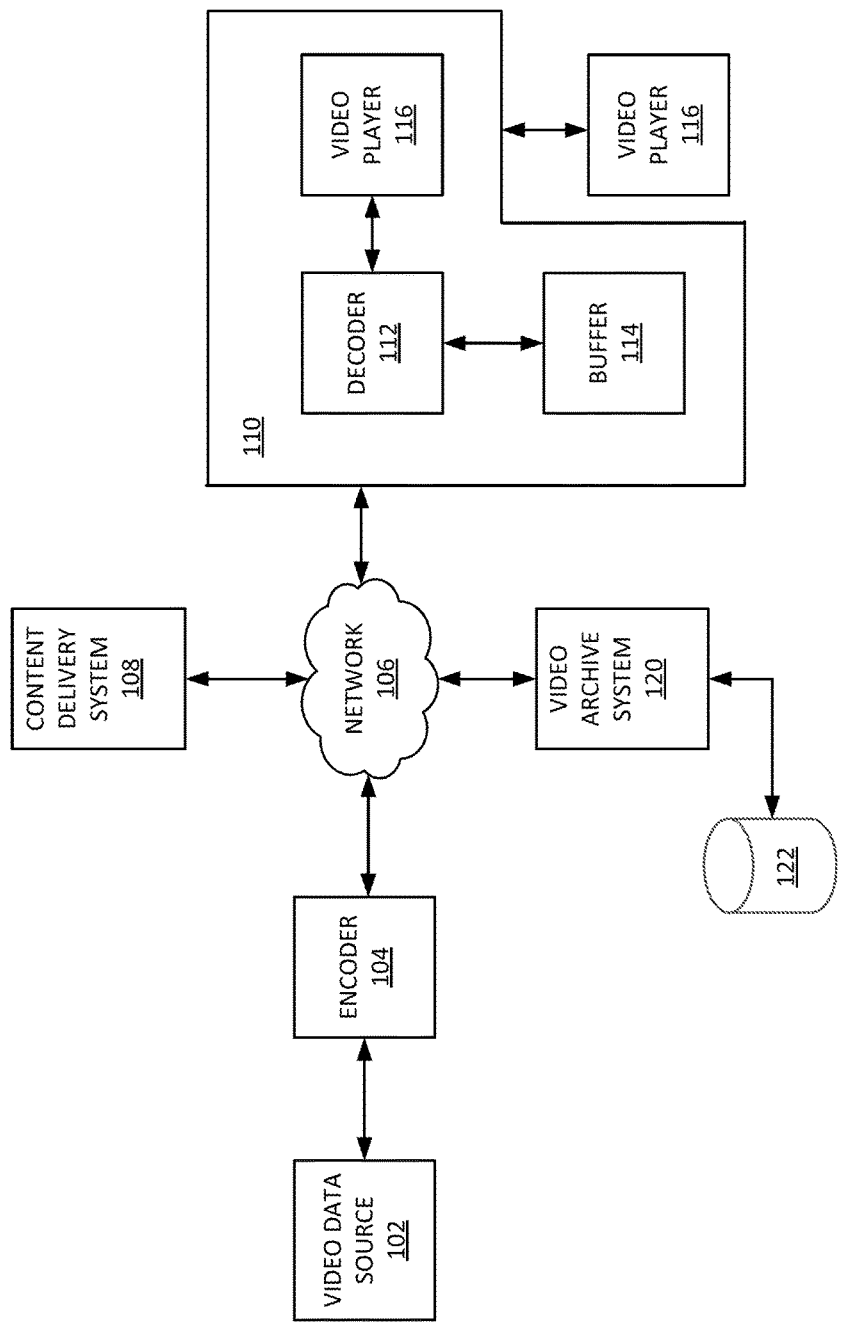
FIG. 1 shows an example system.

Systems and methods are described herein for processing video data. This techniques for video processing described herein are applicable for any delivery method including but not limited to Dynamic Adaptive Streaming over Hypertext Transfer Protocol (HTTP) (DASH), HTTP Live Streaming (HLS), the QAM digital television standard, and adaptive bitrate (ABR) streaming.

Video data used in the embodiments described herein may comprise video frames or other images. Video frames may comprise pixels. A pixel may comprise a smallest controllable element of a video frame. A video frame may comprise bits for controlling each associated pixel. A portion of the bits for an associated pixel may control a luma value (e.g., light intensity) of each associated pixel. A portion of the bits for an associated pixel may control one or more chrominance value (e.g., color) of the pixel. The video may be processed by a video codec comprising an encoder and decoder. When video data is transmitted from one location to another, the encoder may encode the video (e.g., into a compressed format) using a compression technique prior to transmission. The decoder may receive the compressed video and decode the video (e.g., into a decompressed format). The systems and methods described herein may process video content using a codec that enables encoding and decoding video content associated with a plurality of resolutions.

Encoding video may comprise partitioning a frame of video data into a plurality of coding tree units (CTUs) or macroblocks that each comprising a plurality of pixels. The CTUs or macroblock may be partitioned into coding units (CUs) or coding blocks. The terms coding unit and coding block may be used interchangeably herein. The encoder may generate a prediction of each current CU based on previously encoded data. The prediction may comprise intra-prediction, which is based on previously encoded data of the current frame being encoded. The prediction may comprise inter-prediction, which is based on previously encoded data of a previously encoded reference frame. The inter-prediction stage may comprise determining a prediction unit (PU) (e.g., a prediction area) using motion compensation by determining a PU that best matches a prediction region in the CU. The encoder may generate a residual signal by determining a difference between the determined PU from the prediction region in the CU. The residual signals may then be transformed using, for example, a discrete cosine transform (DCT), which may generate coefficients associated with the residuals. The encoder may then perform a quantization process to quantize the coefficients. The transformation and quantization processes may be performed on transform units (TUs) based on partitions of the CUs. The compressed bitstream comprising video frame data may then be transmitted by the encoder. The transmitted compressed bitstream may comprise the quantized coefficients and information to enable the decoder to regenerate the prediction blocks, such as motion vector associated with the motion compensation. The decoder may receive the compressed bitstream and may decode the compressed bitstream to regenerate the video content.

In accordance with the methods and apparatuses described herein, an encoder may transmit information indicating a duration that a particular frame of video data should be displayed. The information may comprise an indication of whether the particular frame should be displayed for an increased duration (e.g., displayed twice, thrice, etc.). For example, the indication may signal, to a decoder, a duration to display a frame or a number of times to repeat a frame. During encoding, a decision may be made whether the particular frame should be displayed for the increased duration. The decision may be based on a similarity analysis. The similarity analysis may be performed by the encoder.

By displaying a particular frame for an increased duration based on a similarity analysis, the encoder does not need to encode the frames determined to be similar to the particular frame being displayed for the increased duration. As a result, compression efficiency may be improved because the encoder may encode fewer total frames when sending a stream of video content to a decoder. This compression efficiency improvement may enable reducing the total bitrate of the video stream or redistributing bits in order to increase the overall visual quality. Further, this technique may be used in a software real-time encoder when the encoder needs to increase its encoding speed (e.g., the encoder is encoding the most recent frames slower than real-time and needs to "catch up").

Information indicating the decision to display a particular frame for an increased duration may be inserted into a message. The message may comprise a supplemental enhancement information (SEI) message. The encoder may transmit the message to a decoder, which may then decode the information and cause a display device to display the particular frame for the duration. The transmitted message may be transmitted in a compressed bitstream or transport stream comprising video frame data. The video frame data information may be sent once to the decoder. The message may comprise instructions for the decoder that notifies the decoder that it is receiving the video frame data only once and that the frame is to be recreated, doubled, tripled, etc. for the next displayed frame.

Conventional systems have previously used SEI message fields to signal switching between frame rates. Both H.264 and H.265 specifications allow for extending a picture duration using pic_struct structure, contained within an SEI message within an access unit. The pic_struct field in this structure instructs the decoder to display the same picture on the screen of a display device for twice or thrice its duration. For example, in the case of 60 frames per second (fps), a single frame is displayed for 16.683 milliseconds (ms), while an instruction to triple its duration would cause it to remain on the screen for 50.05 ms. In the embodiments described herein, this syntax may be used to cause display of only one of a plurality of similar frames. The pic_struct field may be used to extend the duration of one frame that is similar to one or more other frames. This may be performed by the encoder, based on a pre-analysis, a frame type decision, or after a frame has already been encoded.

Frame similarity may be established by calculating a quality metric between consecutive frames. For example, a quality metric may be determined between frames $L(n) \ldots L(n+k)$, which may comprise consecutive source frames. Frames $L'(n) \ldots L'(n+i)$ may comprise the reconstructed frames. A reconstructed frame is a decoded frame. For example, if frame $L(n)$ is encoded into N bytes, these bytes form the reconstructed frame $L'(n)$ when decoded. The quality metric may comprise a peak signal to noise ratio (PSNR). For example, a PSNR value of 45 dB or higher may indicate near-identical pictures. Another quality metric may comprise a full-reference perceptual quality metric, such as video multimethod assessment fusion (VMAF) or structural similarity (SSIM)+ of. For example, a SSIM+ value of 95+ may also be indicative of near-identical pictures.

Pictures identified as near-identical may be assigned a high similarity score. These similarity scores may then be used to decide whether the frame is to be coded for display for an increased duration (e.g., doubling or tripling display of the previous frame for the next frame or next two frames). The same approach may be applied to the next several frames, for example, $L(n)$, $L(n+1)$, and $L(n+2)$, to determine whether the frame should be further extended (tripled, quadrupled, etc).

Additionally or alternatively, frames may be interpolated. For example, when the motion exists but is slow, a new frame may be created by interpolation of two or three neighboring frames (e.g., using motion-compensated interpolation). The interpolated frame may be further used for being displayed for an increased duration (e.g., being doubled, being tripled, or more).

The similarity score may be adjusted in multiple ways. The adjustments to the similarity score may be based on taking expected perceptible distortion into consideration. In one embodiment, after consecutive frames $L(n)$ and $L(n+1)$ are encoded, the corresponding reconstructed frames (decoded frames) $L'(n+1)$ and $L('n)$ may be compared using a quality metric. If the quality score is sufficiently close (e.g., less than 1 SSIM+ point, 3 VMAF points, or 0.1 dB PSNR), the similarity score of the frame may be increased. A scene cut detection procedure may be used to establish scene boundaries. The human visual system is less likely to notice differences immediately after a scene change or just prior to it. The similarity score of frames in the immediate proximity of a scene boundary may be increased. If transcoding is performed, the percentage of inter-coded blocks coded as predictions from co-located blocks from the previous frame or next frame may be used to verify the score. The existence of global motion may be used to lower the similarity score. Similarly, shorter distances from a previous frame with an extended duration may be used to lower the similarity score as frequent frame extensions may negatively impact motion smoothness.

The result of the process described above is a list of frames with their similarity scores. As noted above, the similarity scores may then be used to decide whether the frame is to be coded as a duplicate (or triplicate or more) of a previous frame. An externally established threshold may be used to set the minimum similarity score for selection of identical sequences. A candidate frame may be selected to be used to represent two or three source frames.

When transcoding is to be performed, a frame type, a quantizer value, and a non-reference quality metric such as natural image quality evaluator (NIQE) may be used to select a better frame to repeat. Also, a percentage of blocks (macroblocks and partitions or CUs) in specific modes (inter/intra, size, quantizer, etc.) may be an additional factor considered when deciding which frame should be extended/repeated. This percentage may comprise a statistical distribution of blocks (macroblocks and partitions or CUs) in specific modes (inter/intra, size, quantizer, etc.). Another factor to consider when deciding which frame should be extended/repeated may comprise a statistical distribution of motion vectors (e.g., the distribution of magnitudes and angles of the vectors). During encoding, in order to preserve the perception of sharpness it may be useful to use lower quantizer for the longer-duration frame.

FIG. 1 shows system 100 configured for video processing. The system 100 may comprise a video data source 102, an encoder 104, a content delivery system 108, a computing device 110, and a video archive system 120. The video archive system 120 may be communicatively connected to a database 122 to store archived video data.

The video data source 102, the encoder 104, the content delivery system 108, the computing device 110, the video archive system 120, and/or any other component of the system 100 may be interconnected via a network 106. The network 106 may comprise a wired network, a wireless network, or any combination thereof. The network 106 may comprise a public network, such as the Internet. The network 106 may comprise a private network, such as a content provider's distribution system. The network 106 may communicate using technologies such as WLAN technology based on the Institute of Electrical and Electronics Engineers (IEEE) 802.11 standard, wireless cellular technology, Bluetooth, coaxial cable, Ethernet, fiber optics, microwave, satellite, Public Switched Telephone Network (PTSN), Digital Subscriber Line (DSL), BPL, or any other appropriate technologies.

The video data source 102 may comprise a headend, a video on-demand server, a cable modem termination system, the like, and/or any combination of the foregoing. The video data source 102 may provide uncompressed, raw video data comprising a sequence of frames. The video data source 102 and the encoder 104 may be incorporated as a single device and/or may be co-located at a premises. The video data source 102 may provide the uncompressed video data based on a request for the uncompressed video data, such as a request from the encoder 104, the computing device 110, the content delivery system 108, and/or the video archive system 120.

The content delivery system 108 may receive a request for video data from the computing device 110. The content delivery system 108 may authorize/authenticate the request and/or the computing device 110 from which the request originated. The request for video data may comprise a request for a channel, a video on-demand asset, a website address, a video asset associated with a streaming service, the like, and/or any combination of the foregoing. The video data source 102 may transmit the requested video data to the encoder 104.

The encoder 104 may encode (e.g., compress) the video data. The encoder 104 may transmit the encoded video data to the requesting component, such as the content delivery system 108 or the computing device 110. The content delivery system 108 may transmit the requested encoded video data to the requesting computing device 110. The video archive system 120 may provide a request for encoded video data. The video archive system 120 may provide the request to the encoder 104 and/or the video data source 102. Based on the request, the encoder 104 may receive the corresponding uncompressed video data. The encoder 104 may encode the uncompressed video data to generate the requested encoded video data. The encoded video data may be provided to the video archive system 120. The video archive system 120 may store (e.g., archive) the encoded video data from the encoder 104. The encoded video data may be stored in the database 122. The stored encoded video data may be maintained for purposes of backup or archive. The stored encoded video data may be stored for later use as "source" video data, to be encoded again and provided for viewer consumption. The stored encoded video data may be provided to the content delivery system 108 based on a request from a computing device 110 for the encoded video data. The video archive system 120 may provide the requested encoded video data to the computing device 110.

The computing device 110 may comprise a decoder 112, a buffer 114, and a video player 116. The computing device 110 (e.g., the video player 116) may be communicatively connected to a display 118. The display 118 may be a separate and discrete component from the computing device 110, such as a television display connected to a set-top box. The display 118 may be integrated with the computing device 110. The decoder 112, the video player 116, the buffer 114, and the display 118 may be realized in a single device, such as a laptop or mobile device. The computing device 110 (and/or the computing device 110 paired with the display 118) may comprise a television, a monitor, a laptop, a desktop, a smart phone, a set-top box, a cable modem, a gateway, a tablet, a wearable computing device, a mobile computing device, any computing device configured to receive and/or playback video, the like, and/or any combination of the foregoing. The decoder 112 may decompress/decode the encoded video data. The encoded video data may be received from the encoder 104. The encoded video data may be received from the content delivery system 108, and/or the video archive system 120.

Figure 2:
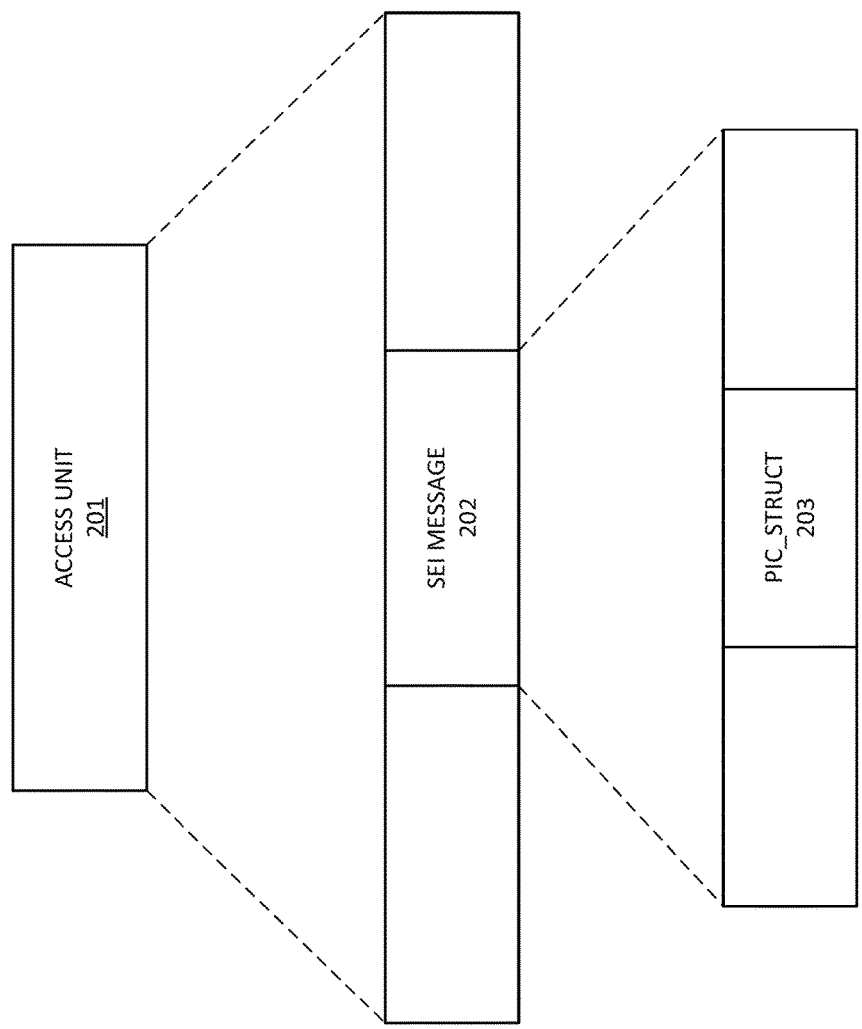
FIG. 2 shows an example message.

FIG. 2 shows an example message structure 200 that may be configured to display a particular frame for an increased duration based on a similarity analysis in accordance with one embodiment, which may be used in combination with any of the embodiments described herein. The example of FIG. 2 shows an access unit 201. The access unit 201 may comprise encoded data usable for decoding an image in a video frame. The access unit may comprise an SEI message 202. The SEI message may comprise a pic_struct 203. The pic_struct 203 may comprise information indicating a decision, based on a similarity analysis, to display a particular frame for an increased duration.

Figure 3:
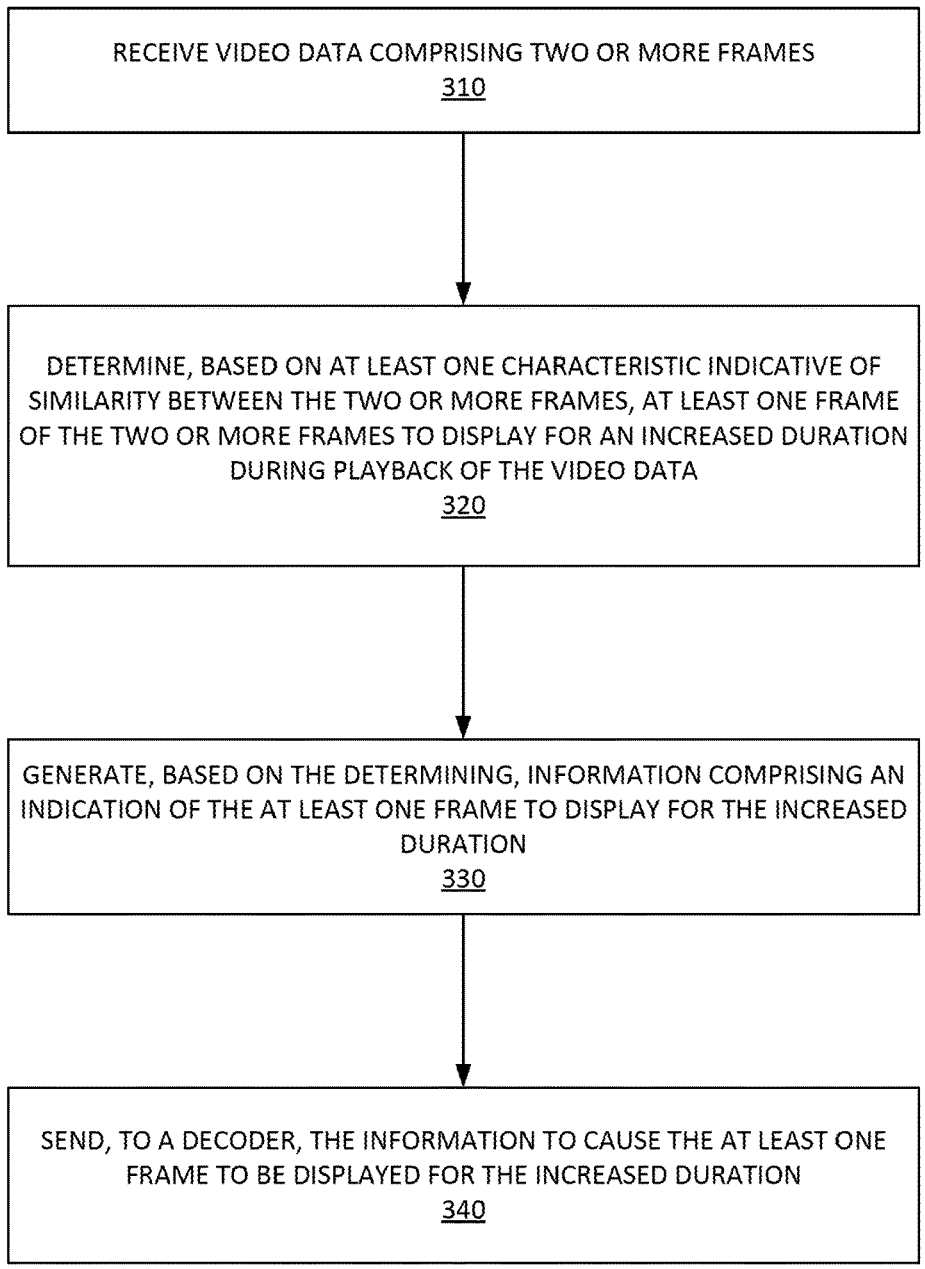
FIG. 3 shows an example method.

FIG. 3 shows an example method 300. The method 300 of FIG. 3, may be performed by the encoder 104 or computing device 110 of FIG. 1. At step 310, an encoder may receive video data comprising two or more frames.

At step 320, the encoder may determine based on at least one characteristic indicative of similarity between the two or more frames, at least one frame of the two or more frames to display for an increased duration during playback of the video data. By displaying the at least one frame of the two or more frames to display for the increased duration, the encoder may decide not to encode other frames that are similar to the at least one frame. The at least one characteristic may comprise a quality metric between consecutive frames of the two or more frames. The quality metric may comprise a PSNR, VMAF, or SSIM+ that exceeds a predetermined threshold. The at least one characteristic may be associated with a score. The score may comprise a similarity score. The score is based on the quality metric between consecutive frames of the two or more frames. The score may be increased based on a scene cut detected in the consecutive frames of the two or more frames.

At step 330, the encoder may generate based on the determining, information comprising an indication of the at least one frame to display for the increased duration. At step 340, the encoder may send, to a decoder, the information to cause the at least one frame to be displayed for the increased duration. The information may be sent to the decoder in an SEI message.

Figure 4:
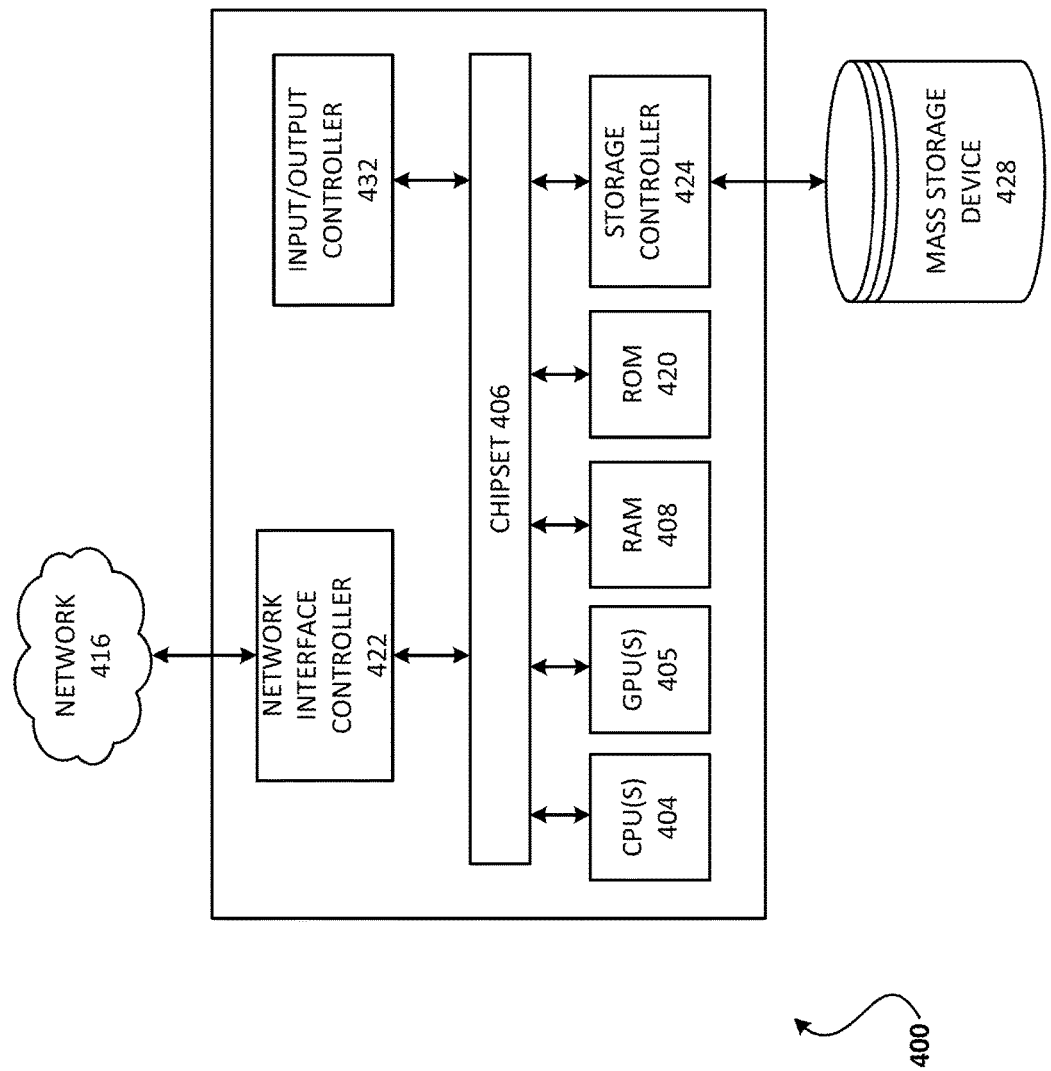
FIG. 4 depicts an example computing device.

FIG. 4 depicts a computing device 400 that may be used in various aspects, such as the servers, modules, and/or devices depicted in FIG. 1. With regard to the example architectures of FIG. 1, the devices may each be implemented in an instance of a computing device 400 of FIG. 4. The computer architecture shown in FIG. 4 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 3.

The computing device 400 may include a baseboard, or "motherboard," which is a printed circuit board to which a multitude of components or devices may be connected by way of a system bus or other electrical communication paths. One or more central processing units (CPUs) 404 may operate in conjunction with a chipset 406. The CPU(s) 404 may be standard programmable processors that perform arithmetic and logical operations necessary for the operation of the computing device 400.

The CPU(s) 404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 404 may be augmented with or replaced by other processing units, such as GPU(s) 405. The GPU(s) 405 may comprise processing units specialized for but not necessarily limited to highly parallel computations, such as graphics and other visualization-related processing.

A chipset 406 may provide an interface between the CPU(s) 404 and the remainder of the components and devices on the baseboard. The chipset 406 may provide an interface to a random access memory (RAM) 408 used as the main memory in the computing device 400. The chipset 406 may further provide an interface to a computer-readable storage medium, such as a read-only memory (ROM) 420 or non-volatile RAM (NVRAM) (not shown), for storing basic routines that may help to start up the computing device 400 and to transfer information between the various components and devices. ROM 420 or NVRAM may also store other software components necessary for the operation of the computing device 400 in accordance with the aspects described herein.

The computing device 400 may operate in a networked environment using logical connections to remote computing nodes and computer systems through local area network (LAN) 416. The chipset 406 may include functionality for providing network connectivity through a network interface controller (NIC) 422, such as a gigabit Ethernet adapter. A NIC 422 may be capable of connecting the computing device 400 to other computing nodes over a network 416. It should be appreciated that multiple NICs 422 may be present in the computing device 400, connecting the computing device to other types of networks and remote computer systems.

The computing device 400 may be connected to a mass storage device 428 that provides non-volatile storage for the computer. The mass storage device 428 may store system programs, application programs, other program modules, and data, which have been described in greater detail herein. The mass storage device 428 may be connected to the computing device 400 through a storage controller 424 connected to the chipset 406. The mass storage device 428 may consist of one or more physical storage units. A storage controller 424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 400 may store data on a mass storage device 428 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 428 is characterized as primary or secondary storage and the like.

For example, the computing device 400 may store information to the mass storage device 428 by issuing instructions through a storage controller 424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 may further read information from the mass storage device 428 by detecting the physical states or characteristics of one or more particular locations within the physical storage units.

In addition to the mass storage device 428 described herein, the computing device 400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 428 depicted in FIG. 4, may store an operating system utilized to control the operation of the computing device 400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 428 may store other system or application programs and data utilized by the computing device 400.

The mass storage device 428 or other computer-readable storage media may also be encoded with computer-executable instructions, which, when loaded into the computing device 400, transforms the computing device from a general-purpose computing system into a special-purpose computer capable of implementing the aspects described herein. These computer-executable instructions transform the computing device 400 by specifying how the CPU(s) 404 transition between states, as described herein. The computing device 400 may have access to computer-readable storage media storing computer-executable instructions, which, when executed by the computing device 400, may perform the methods described in relation to FIG. 3.

A computing device, such as the computing device 400 depicted in FIG. 4, may also include an input/output controller 432 for receiving and processing input from a number of input devices, such as a keyboard, a mouse, a touchpad, a touch screen, an electronic stylus, or other type of input device. Similarly, an input/output controller 432 may provide output to a display, such as a computer monitor, a flat-panel display, a digital projector, a printer, a plotter, or other type of output device. It will be appreciated that the computing device 400 may not include all of the components shown in FIG. 4, may include other components that are not explicitly shown in FIG. 4, or may utilize an architecture completely different than that shown in FIG. 4.

As described herein, a computing device may be a physical computing device, such as the computing device 400 of FIG. 4. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   receiving video content comprising two or more frames;
   determining, based on one or more quality metrics, a similarity score, associated with each of the two or more frames, that is indicative of similarity between consecutive frames of the two or more frames;
   adjusting, based on one or more criteria, the similarity score, wherein the one or more criteria are associated with at least one of: a scene change in the video content or motion in the video content;
   determining that the adjusted similarity score, associated with at least one frame of the two or more frames, exceeds a threshold indicating a minimum similarity score for identification of similar sequences of frames;
   generating, based on the threshold being exceeded, information comprising an instruction to display the at least one frame for an increased duration during playback of the video content; and
   sending, to a decoder, the information to cause the at least one frame to be displayed for the increased duration.

2. The method of claim 1, wherein the information is sent in a supplemental enhancement information (SEI) message.

3. The method of claim 1, wherein the information further comprises an instruction to not encode a second at least one frame.

4. The method of claim 1, wherein the one or more quality metrics comprise at least one of: a peak signal to noise ratio (PSNR), a video multimethod assessment fusion (VMAF), or a structural similarity (SSIM)+.

5. The method of claim 1, wherein the adjusting increases the similarity score if a scene cut is detected in the consecutive frames of the two or more frames.

6. The method of claim 1, wherein the adjusting decreases the similarity score if motion is detected in the consecutive frames of the two or more frames.

7. The method of claim 1, wherein the adjusting decreases the similarity score if a previous frame, that is a distance shorter than a predetermined distance, was extended.

8. A device, comprising:
   one or more processors; and
   memory storing instructions that, when executed by the one or more processors, cause the device to:
   receive video content comprising two or more frames;
   determine, based on one or more quality metrics, a similarity score, associated with each of the two or more frames, that is indicative of similarity between consecutive frames of the two or more frames;
   adjusting, based on one or more criteria, the similarity score, wherein the one or more criteria are associated with at least one of: a scene change in the video content or motion in the video content;
   determine that the adjusted similarity score, associated with at least one frame of the two or more frames, exceeds a threshold indicating a minimum similarity score for identification of similar sequences of frames;
   generate, based on the threshold being exceeded, information comprising an instruction to display the at least one frame for an increased duration during playback of the video content; and
   send, to a decoder, the information to cause the at least one frame to be displayed for the increased duration.

9. The device of claim 8, wherein the information is sent in a supplemental enhancement information (SEI) message.

10. The device of claim 8, wherein the information further comprises an instruction to not encode a second at least one frame.

11. The device of claim 8, wherein the one or more quality metrics comprise at least one of: a peak signal to noise ratio (PSNR), a video multimethod assessment fusion (VMAF), or a structural similarity (SSIM)+.

12. The device of claim 8, wherein the adjusting increases the similarity score if a scene cut is detected in the consecutive frames of the two or more frames.

13. The device of claim 8, wherein the adjusting decreases the similarity score if motion is detected in the consecutive frames of the two or more frames.

14. The device of claim 8, wherein the adjusting decreases the similarity score if a previous frame, that is a distance shorter than a predetermined distance, was extended.

15. A non-transitory computer-readable medium storing instructions that, when executed, cause:
    receiving video content comprising two or more frames;
    determining, based on one or more quality metrics, a similarity score, associated with each of the two or more frames, that is indicative of similarity between consecutive frames of the two or more frames;
    adjusting, based on one or more criteria, the similarity score, wherein the one or more criteria are associated with at least one of: a scene change in the video content or motion in the video content;
    determining that the adjusted similarity score, associated with at least one frame of the two or more frames, exceeds a threshold indicating a minimum similarity score for identification of similar sequences of frames;
    generating, based on the threshold being exceeded, information comprising an instruction to display the at least one frame for an increased duration during playback of the video content; and
    sending, to a decoder, the information to cause the at least one frame to be displayed for the increased duration.

16. The non-transitory computer-readable medium of claim 15, wherein the information is sent in a supplemental enhancement information (SEI) message.

17. The non-transitory computer-readable medium of claim 15, wherein the information further comprises an instruction to not encode a second at least one frame.

18. The non-transitory computer-readable medium of claim 15, wherein the one or more quality metrics comprise at least one of: a peak signal to noise ratio (PSNR), a video multimethod assessment fusion (VMAF), or a structural similarity (SSIM)+.

19. The non-transitory computer-readable medium of claim 15, wherein the adjusting increases the similarity score if a scene cut is detected in the consecutive frames of the two or more frames.

20. The non-transitory computer-readable medium of claim 15, wherein the adjusting decreases the similarity score if at least one of:
    motion is detected in the consecutive frames of the two or more frames, or
    if a previous frame, that is a distance shorter than a predetermined distance, was extended.

* * * * *